US011597681B2

(12) United States Patent
Skorina et al.

(10) Patent No.: US 11,597,681 B2
(45) Date of Patent: Mar. 7, 2023

(54) GRANULES

(71) Applicant: 3M INNOVATIVE PROPERTIES COMPANY, St. Paul, MN (US)

(72) Inventors: Taisiya Skorina, Woodbury, MN (US); Anatoly Z. Rosenflanz, Maplewood, MN (US); Jean A. Tangeman, Minneapolis, MN (US); Kenton D. Budd, Woodbury, MN (US)

(73) Assignee: 3M Innovative Properties Company, St. Paul, MN (US)

(*) Notice: Subject to any disclaimer, the term of this patent is extended or adjusted under 35 U.S.C. 154(b) by 3 days.

(21) Appl. No.: 16/300,311

(22) PCT Filed: May 11, 2017

(86) PCT No.: PCT/US2017/032204
§ 371 (c)(1),
(2) Date: Nov. 9, 2018

(87) PCT Pub. No.: WO2017/200843
PCT Pub. Date: Nov. 23, 2017

(65) Prior Publication Data
US 2019/0112227 A1 Apr. 18, 2019

Related U.S. Application Data

(60) Provisional application No. 62/336,988, filed on May 16, 2016, provisional application No. 62/336,995, filed on May 16, 2016.

(51) Int. Cl.
*C04B 14/00* (2006.01)
*C04B 18/02* (2006.01)
(Continued)

(52) U.S. Cl.
CPC .......... *C04B 18/021* (2013.01); *C04B 14/043* (2013.01); *C04B 14/28* (2013.01);
(Continued)

(58) Field of Classification Search
CPC ....... C04B 14/042; C04B 14/22; C04B 18/08; C04B 18/021; C04B 2103/54;
(Continued)

(56) References Cited

U.S. PATENT DOCUMENTS 2,547,042 A * 4/1951 Pole .................... C04B 20/1077
428/145
6,372,694 B1 * 4/2002 Osinga .................... C04B 28/26
507/140
(Continued)

FOREIGN PATENT DOCUMENTS

| CA | 2 800 585 | 6/2013 |
| CA | 2 871 737 | 11/2013 |

(Continued)

OTHER PUBLICATIONS

Levinson, R. et al..; "A novel technique for the production of cool colored concrete tile and asphalt shingle roofing products"; Solar Energy Materials & Solar Cells; vol. 94; 2010; pp. 946-954.

*Primary Examiner* — James E McDonough

(57) ABSTRACT

A plurality of granules comprising particulate silicate material bonded together with an inorganic binder, the inorganic binder comprising reaction product of at least alkali silicate and hardener, wherein the hardener is at least one of aluminum phosphate, amorphous aluminosilicate, fluorosilicate, Portland cement, or a calcium silicate, wherein the particulate silicate material is present as at least 50 percent by weight of each granule, based on the total weight of the respective granule, wherein each granule has a total porosity in a range from greater than 0 to 50 percent by volume, based on the total volume of the respective granule, and (Continued)

5mm wherein the granules have Tumble Toughness Value of at least 70 before immersion in water and at least 40 after immersion in water at 20° C.±2° C. for two months. The granules are useful, for example, as roofing granules.

21 Claims, 1 Drawing Sheet

(51) Int. Cl.
  *C04B 38/00* (2006.01)
  *E04D 7/00* (2006.01)
  *C04B 14/04* (2006.01)
  *C04B 14/28* (2006.01)
  *C04B 14/30* (2006.01)
  *C04B 7/00* (2006.01)
  *C04B 7/34* (2006.01)
  *C04B 28/00* (2006.01)
  *C04B 32/00* (2006.01)
  *C04B 111/00* (2006.01)
  *E04D 1/00* (2006.01)

(52) U.S. Cl.
  CPC .......... *C04B 14/303* (2013.01); *C04B 14/305* (2013.01); *C04B 38/009* (2013.01); *E04D 7/005* (2013.01); *C04B 2111/00586* (2013.01); *E04D 1/00* (2013.01); *E04D 2001/005* (2013.01)

(58) Field of Classification Search
  CPC ... C04B 14/304; C04B 14/305; C04B 14/308; C04B 14/42; C04B 35/62886; C04B 14/04; C04B 14/16; C04B 14/46; C04B 16/00; C04B 20/04; C04B 20/1018; C04B 2235/3418; C04B 2111/00482; C04B 2235/3427; C04B 2235/3454; C04B 2235/36; C04B 2235/6567; C04B 2235/77; C04B 33/1305; C04B 33/1324; C04B 35/6281; C04B 14/043; C04B 14/28; C04B 14/303; C04B 38/009; C04B 2111/005; C04B 14/00; C04B 7/00; C04B 7/34; C04B 28/00; C04B 32/00; E21B 33/13; E04D 7/005; E04D 1/00; E04D 2001/005
  USPC ......................................... 106/400, 401, 638
  See application file for complete search history.

(56) References Cited

U.S. PATENT DOCUMENTS

| 7,388,063 | B2 | 6/2008 | Zanghellini |
| 8,142,531 | B2 | 3/2012 | Adefris et al. |
| 8,637,116 | B2* | 1/2014 | Shiao ........................ B01J 2/006 427/218 |
| 2004/0258835 | A1* | 12/2004 | Hong ........................ E04D 1/22 427/180 |
| 2010/0151199 | A1 | 6/2010 | Shiao et al. |
| 2010/0203336 | A1* | 8/2010 | Shiao ........................ C04B 33/04 428/404 |
| 2013/0004713 | A1 | 1/2013 | Zhu |
| 2014/0248467 | A1 | 9/2014 | Shiao et al. |

FOREIGN PATENT DOCUMENTS

| CA | 2 876 893 | 12/2013 |
| CA | 2 545 903 | 2/2015 |
| WO | WO 2008/147971 | 12/2008 |
| WO | WO 2008/147972 | 12/2008 |
| WO | WO 2009/145968 | 12/2009 |
| WO | WO 2010/091326 | 8/2010 |
| WO | WO 2013/192336 | 12/2013 |
| WO | WO 2014/042987 | 3/2014 |
| WO | WO 2014/042988 | 3/2014 |
| WO | WO 2014/043212 | 3/2014 |
| WO | WO 2015/112590 | 7/2015 |
| WO | WO 2015/157612 | 10/2015 |
| WO | WO 2015/157615 | 10/2015 |
| WO | WO 2017/200844 | 11/2017 |

* cited by examiner

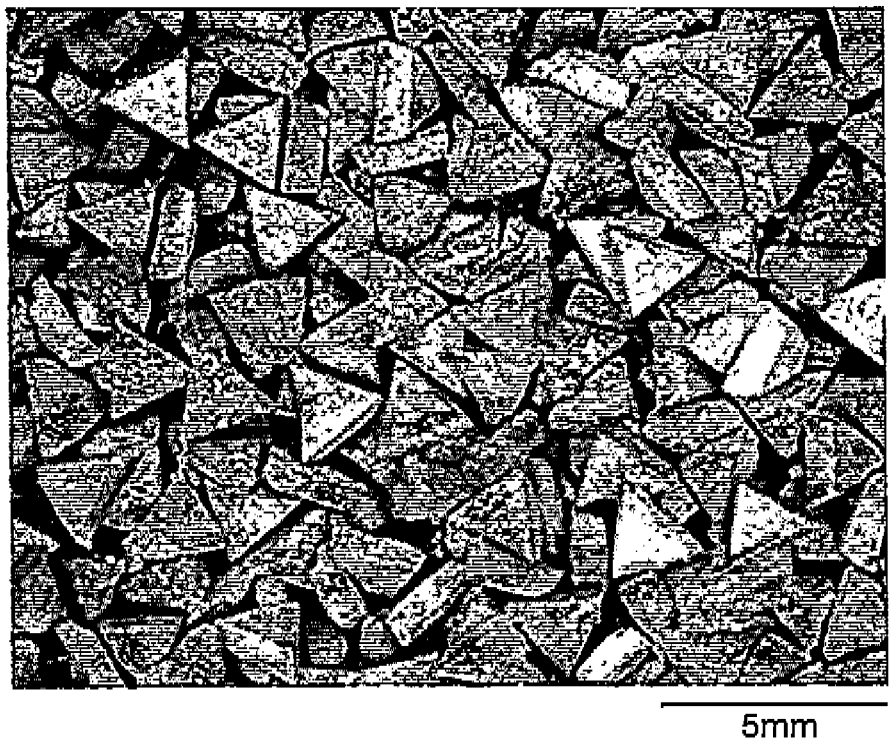
5mm

GRANULES

CROSS REFERENCE TO RELATED APPLICATIONS

This application is a national stage filing under 35 U.S.C. 371 of PCT/US2017/032204, filed May 11, 2017, which claims the benefit of U.S. Provisional Application Nos. 62/336,995, filed May 16, 2016 and 62/336,988, filed May 16, 2016, the disclosures of which are incorporated by reference in their entireties herein.

BACKGROUND

Conventional roofing granules consist of a core baserock of dacite, nepheline syenite, rhyolite, andesite, etc., coated with at least one layer of pigment-containing coating. A typical coating is composed of sodium silicate mixed with raw clay and a pigmenting oxide. As an alternative to conventional coated baserock granules, this invention describes synthetic low to moderate cost roofing granules derived from fine mineral powder (e.g., waste fines associated with conventional roofing granule technology).

SUMMARY

In one aspect, the present disclosure describes a plurality of granules comprising particulate silicate material, wherein the granules are bonded together with an inorganic (i.e., nonorganic) binder, the inorganic binder comprising reaction product of at least alkali silicate and hardener (in some embodiments further comprising alkali silicate itself), wherein the hardener is at least one of aluminum phosphate, amorphous aluminosilicate, fluorosilicate, Portland cement, or a calcium silicate, wherein the particulate silicate material is present as at least 50 (in some embodiments, at least 55, 60, 65, 70, 75, 80, or even at least 85; in some embodiments, in a range from 50 to 85, or even 60 to 85) percent by weight of each granule, based on the total weight of the respective granule, wherein each granule has a total porosity in a range from greater than 0 to 50 (in some embodiments, in a range from 5 to 50, or even 20 to 40) percent by volume, based on the total volume of the respective granule, and wherein the granules have Tumble Toughness Value of at least 70 (in some embodiments, at least 75, 80, 90, 95, 96, 97, 98, or even at least 99) before immersion in water and at least 40 (in some embodiments, of at least 45, 50, 55, 60, 65, 70, 75, 80, 85 or even at least 90) after immersion in water at 20° C.±2° C. for two months.

In some embodiments, each granule collectively comprises at least 80 (in some embodiments, at least 85, 90, or even at least 95; in some embodiments, in a range from 80 to 95) percent by weight collectively of the particulate silicate material and reaction product of the alkali silicate and the hardener, based on the total weight of the respective granule. In some embodiments, each granule collectively comprises at least 80 (in some embodiments, at least 85, 90, or even at least 95; in some embodiments, in a range from 80 to 95) percent by weight collectively of the particulate silicate material, alkali silicate, and reaction product of the alkali silicate and the hardener, based on the total weight of the respective granule.

In this application:

"amorphous" refers to material that lacks any long range crystal structure, as determined by the X-ray diffraction technique described in the Examples;

"functional additive" refers to a material that substantially changes at least one property (e.g., durability and resistance to weathering) of a granule when present in an amount not greater than 10 percent by weight of the granule;

"glass" refers to amorphous material exhibiting a glass transition temperature;

"hardener" refers to a material that initiates and/or enhances hardening of an aqueous silicate solution; hardening implies polycondensation of dissolved silica into three-dimensional Si—O—Si(Al, P) bond network and/or crystallization of new phases; in some embodiments, the granules comprise excess hardener;

"mineral" refers to a solid inorganic material of natural occurrence; and

"partially crystallized" refers to material containing a fraction of material characterized by long range order.

In another aspect, the present disclosure describes making the plurality of granules described herein, the method comprising:

curing an aqueous dispersion comprising particulate silicate material, alkali silicate precursor, and hardener to provide cured material; and crushing the cured material to provide the granules.

In another aspect, the present disclosure describes a method of making the plurality of granules described herein, the method comprising:

mixing material comprising particulate silicate material, alkali silicate precursor, and hardener to provide agglomerates comprising particulate silicate material, alkali silicate precursor, and hardener; and curing the agglomerates to provide the granules.

In another aspect, the present disclosure describes a method of making the plurality of granules described herein, the method comprising:

spray drying an aqueous dispersion comprising particulate silicate material, alkali silicate, and hardener to provide agglomerates comprising particulate silicate material, alkali silicate precursor, hardener; and curing the agglomerates to provide the granules.

In another aspect, the present disclosure describes a method of making the plurality of granules described herein, the method comprising:

providing an aqueous dispersion in a tool comprising a plurality of cavities, the aqueous dispersion comprising particulate silicate material and alkali silicate precursor; and curing the aqueous dispersion in a tool to provide the granules.

Granules described herein are useful, for example, as roofing granules.

Advantages of embodiments of granules described herein may include enhanced solar reflectance, density control, and size/shape control, as compared to conventional roofing granules.

BRIEF DESCRIPTION OF THE DRAWING

The FIGURE is an optical image of EX2 material.

DETAILED DESCRIPTION

Suitable alkali silicates include cesium silicate, lithium silicate, a potassium silicate, or a sodium silicate. Exemplary alkali silicates are commercially available, for example, from PQ Corporation, Malvern, Pa. In some embodiments, the inorganic binder further comprises reaction product of amorphous aluminosilicate hardener.

In some embodiments, the hardener is at least one of aluminum phosphate, amorphous aluminosilicate, fluorosilicate, Portland cement, or a calcium silicate. In some embodiments, the hardener may further comprise zinc borate. In some embodiments, the hardener is amorphous. Exemplary hardeners are commercially available, for example, from commercial sources such as Budenheim Inc., Budenheim, Germany, and Solvay Fluorides, LLC, Houston, Tex.

In some embodiments, the inorganic binder is present as at least 5, 10, 15, 20, 25, 30, 35, 40, or 45, or even up to 50 (in some embodiments, in a range from 5 to 50, 10 to 50, or even 25 to 50) percent by weight of each granule, based on the total weight of the respective granule. In some embodiments, the ratio of alkali silicate to hardener is in a range from 20:1 to 2:1.

In some embodiments, the particulate silicate material comprises at least one of tectosilicate mineral (e.g., albite, orthoclase, microcline, etc.) or phyllosilicate mineral (e.g., kaolinite. halloysite, montmorillonite, etc.). Exemplary particulate silicate material can be obtained by techniques known in the art and/or obtained from commercial sources such as Ione Minerals, Ione, Calif., and Active Minerals Int., LLC, Quincy, Fla.

In some embodiments, the granules comprise ceramic particles, wherein the ceramic particles of each granule comprises no more than 10 (in some embodiments, no greater than 5, 4, 3, 2, 1, or even zero) percent by weight, on a theoretical oxides basis, $TiO_2$, based on the total weight of the granule for the respective granule. In some embodiments, the ceramic particles of each granule comprises no more than 10 (in some embodiments, no greater than 5, 4, 3, 2, 1, or even zero) percent by weight pure $TiO_2$, based on the total weight of the granule for the respective granule. In some embodiments, the ceramic particles of each granule comprises no more than 10 (in some embodiments, no greater than 5, 4, 3, 2, 1, or even zero) percent by weight pure $Al_2O_3$, based on the total weight of the granule for the respective granule.

In some embodiments, the particulate silicate material has an average particles sizes in a range from 200 nanometers to 200 micrometers, 200 nanometers to 100 micrometers, 250 nanometers to 50 micrometers, 500 nm to 2 micrometers, 2 micrometers to 5 micrometers, or even 5 micrometers to 20 micrometers. In some embodiments, the particulate silicate material has a continuous or bimodal distribution of sizes. In some embodiments, the particulate silicate material may have a broad distribution of particle sizes, while in others, it may have a narrow distribution of particle sizes.

In some embodiments, the particulate silicate particles each have a longest dimension, wherein the granules each have a longest dimension, and wherein the longest dimension of each ceramic particle for a given granule is no greater than 20% (in some embodiments, no greater than 25%) of the diameter of said given granule.

In some embodiments, the granules further comprise at least one of a functional additive (e.g., rheology modifier, durability modifier, and fluxing agent), organic binder, or pigment. Exemplary rheology modifiers include surfactants, which are available, for example, from BYK Additives & Instruments, Geretsried, Germany. Exemplary durability modifiers include nanosilica, pyrogenic ("fumed") silica, and silica fume, which are available, for example, from Evonik Industries, Essen, Germany.

Exemplary fluxing agents include borax, which is available, for example, from Rio Tinto Minerals, Boron, Calif. Exemplary organic binders include dextrin and carboxymethylcellulose, which are available, for example, from Dow Chemical Company, Midland, Mich. Exemplary pigments include those available from Ferro Corporation, Mayfield Heights, Ohio, under the trade designations "10415 GOLDEN YELLOW," "10411 GOLDEN YELLOW," "10364 BROWN," "10201 ECLIPSE BLACK," "V-780 IR BRN BLACK," "10241 FOREST GREEN," "V-9248 BLUE," "V-9250 BRIGHT BLUE," and "F-5686 TURQUOISE."

Embodiments of granules described herein can be made by a variety of methods. For example, one method comprises:

curing an aqueous dispersion comprising particulate silicate material, alkali silicate precursor, and hardener to provide cured material; and crushing the cured material to provide the granules.

The dispersion can be prepared using techniques known in the art. In some embodiments, water is present in the aqueous dispersion up to 75 (in some embodiments, up to 70, 65, 60, 55, 50, 45, 40, 35, 30, 25, 20, or even up to 15; in some embodiments, in a range from 15 to 75, 15 to 50, or even 15 to 35) percent by weight, based on the total weight of the aqueous dispersion.

The aqueous dispersion can be cured by techniques known in the art, including heating the dispersion in an oven. In some embodiments, the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min. The selection of the heating rate(s) and temperature(s) may be influenced by the composition and/or size of the materials being cured.

Techniques for crushing and screening the cured material to provide the desired size and particle size distribution of granules are known in the art.

A second method comprises:

mixing material comprising particulate silicate material, alkali silicate precursor, and hardener to provide agglomerates comprising particulate silicate material, alkali silicate precursor, and hardener; and curing the agglomerates to provide the granules.

The material can be mixed using techniques known in the art for agglomerating material. Typically, a liquid such as water is introduced (periodically or continually) to aid in the agglomerating the material.

In some embodiments, the material is an aqueous dispersion, which can be made using techniques known in the art. In some embodiments, water is present in up to 75, 70, 65, 60, 55, 50, 45, 40, 35, 30, 25, 20, or even up to 15 (in some embodiments, in a range from 15 to 75, 15 to 50, or even 15 to 35) percent by weight, based on the total weight of the aqueous dispersion.

Curing can be done by techniques known in the art, including heating the material to be cured in an oven. In some embodiments, the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min. The selection of the heating rate(s) and temperature(s) may be influenced by the composition and/or size of the materials being cured.

A third method comprises:

spray drying an aqueous dispersion comprising particulate silicate material, alkali silicate precursor, and hardener to provide agglomerates comprising particulate silicate material, alkali silicate precursor, and hardener; and curing the agglomerates to provide the granules.

The dispersion can be prepared using techniques known in the art. In some embodiments, water is present in the aqueous dispersion up to 75, 70, 65, 60, 55, 50, 45, 40, 35, 30, 25, 20, or even up to 15 (in some embodiments, in a range from 15 to 75, 15 to 50, or even 15 to 35) percent by weight, based on the total weight of the aqueous dispersion.

The agglomerates can be cured by techniques known in the art, including curing in a batch oven or continuous rotary furnace. In some embodiments, the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min. The selection of the heating rate(s) and temperature(s) may be influenced by the composition and/or size of the materials being cured.

A fourth method comprises:

providing an aqueous dispersion in a tool comprising a plurality of cavities, the aqueous dispersion comprising particulate silicate material, alkali silicate precursor, and hardener; and curing the aqueous dispersion in a tool to provide the granules.

The dispersion can be prepared using techniques known in the art. In some embodiments, water is present in the aqueous dispersion up to 75, 70, 65, 60, 55, 50, 45, 40, 35, 30, 25, 20, or even up to 15 (in some embodiments, in a range from 15 to 75, 15 to 50, or even 15 to 35) percent by weight, based on the total weight of the aqueous dispersion.

The tool can be a mold having at least one mold cavity, more typically a plurality of cavities. The cavity can be configured to have the desired three-dimensional shape. In one exemplary embodiment, the shape of a cavity can be described as being a triangle as viewed from the top. Other exemplary cavity shapes include circles, rectangles, squares, hexagons, stars, etc., to provide shapes such as cubes, truncated cubes, pyramids, truncated pyramids, triangles, tetrahedra, spheres, hemispheres, cones and combinations thereof. The shapes typically have a substantially uniform depth dimension. Such molds can be made using techniques known in the art, including that reported in U.S. Pat. No. 8,142,531 (Adefris et al.), the disclosure of which is incorporated herein by reference.

Curing can be conducted using techniques known in the art, including heating the tool with the dispersion in the cavities in an oven. In some embodiments, the curing is conducted at least in part at a temperature in a range from 40° C. to 500° C., 50° C. to 450° C., 50° C. to 350° C., 50° C. to 250° C., 50° C. to 200° C., 50° C. to 150° C., 50° C. to 100° C., or even 50° C. to 80° C. In some embodiments, curing is conducted in two stages. For example, a first curing stage at least in part at a temperature in a range from 20° C. to 100° C., and a second, final curing stage at least in part at a temperature in a range 200° C. to 500° C. In some embodiments, the heating rate for each stage is at one or more rates in a range from 5° C./min. to 50° C./min. The selection of the heating rate(s) and temperature(s) may be influenced by the composition and/or size of the materials being cured.

In some embodiments, the granules have particle sizes in a range from 25 micrometers to 5 millimeters, 50 micrometers to 1 millimeter, 100 micrometers to 500 micrometers, 200 micrometers to 500 micrometers; 500 micrometers to 2 millimeters; or even 2 millimeters to 5 millimeters.

In some embodiments, the inorganic binder is amorphous. In some embodiments, the inorganic binder is partially crystallized.

In some embodiments, the granules have a density in a range from 0.5 g/cm$^3$ to 3 g/cm$^3$.

In some embodiments, the granules have an as-cured outer surface (i.e., the granules have the surface as-made, as opposed being granules obtained by crushing).

The granules may be in any of a variety of shapes, including cubes, truncated cubes, pyramids, truncated pyramids, triangles, tetrahedra, spheres, hemispheres, and cones. In some embodiments, a granule can have a first face and a second face separated by a thickness. In some embodiments, such granules further comprise at least one of a straight or sloping wall.

In some embodiments, granules described herein have a Tumble Toughness Value, after immersion in water for two months at 20° C.±2° C., of at least 40, 45, 50, 55, 60, 65, 70, 75, 80, 85 or even at least 90.

In some embodiments, the granules have a Stain Value (as determined by the Stain Value Test described in the Examples) of not greater than 15 (in some embodiments, not greater than 10, 5, 4, 3, 2, 1, or even not greater than 0.5).

Granules described herein are useful, for example, as roofing granules. For example, granules described herein can be used to make roofing material comprising a substrate and the granules thereon. Advantages of embodiments of granules described herein may include enhanced solar reflectance, density control, and size/shape control as compared to conventional roofing granules.

EXEMPLARY EMBODIMENTS

1A. A plurality of granules comprising particulate silicate material bonded together with an inorganic binder, the inorganic binder comprising reaction product of at least alkali silicate and hardener (in some embodiments further comprising alkali silicate itself), wherein the hardener is at least one of aluminum phosphate, amorphous aluminosilicate, fluorosilicate, Portland cement, or a calcium silicate, wherein the particulate silicate material is present as at least 50 (in some embodiments, at least 55, 60, 65, 70, 75, 80, or even at least 85; in some embodiments, in a range from 50 to 85, or even 60 to 85) percent by weight of each granule, based on the total weight of the respective granule, wherein each granule has a total porosity in a range from greater than 0 to 50 (in some embodiments, in a range from 5 to 50, or even 20 to 40) percent by volume, based on the total volume of the respective granule, and wherein the granules have a Tumble Toughness Value of at least 70 (in some embodiments, of at least 75, 80, 90, 95, 96, 97, 98, or even at least 99) before immersion in water and of at least 40, (in some embodiments, of at least 45, 50, 55, 60, 65, 70, 75, 80, 85 or even at least 90) after immersion in water at 20° C.±2° C. for two months.

2A. The plurality of granules of Exemplary Embodiment 1A, wherein each granule collectively comprises at least 80 (in some embodiments, at least 85, 90, or even at least 95; in some embodiments, in a range from 80 to 95) percent by weight collectively of the particulate silicate material and reaction product of the alkali silicate and the hardener, based on the total weight of the respective granule.

3A. The plurality of granules of Exemplary Embodiment 1A, wherein each granule collectively comprises at least 80 (in some embodiments, at least 85, 90, or even at least 95; in some embodiments, in a range from 80 to 95) percent by weight collectively of the particulate silicate material, alkali silicate, and reaction product of the alkali silicate and the hardener, based on the total weight of the respective granule.

4A. The plurality of granules of any preceding A Exemplary Embodiment, wherein the particulate silicate particles each have a longest dimension, wherein the granules each have a longest dimension, and wherein the longest dimension of each ceramic particle for a given granule is no greater than 20% (in some embodiments, no greater than 25%) of the diameter of said given granule.

5A. The plurality of granules of any preceding A Exemplary Embodiment further comprising additional ceramic particles, wherein the ceramic particles of each granule comprises no more than 10 (in some embodiments, no greater than 5, 4, 3, 2, 1, or even zero) percent by weight pure $TiO_2$, based on the total weight of the granule for the respective granule.

6A. The plurality of granules of any of Exemplary Embodiments 1A to 3A, wherein the ceramic particles of each granule comprises no more than 10 (in some embodiments, no greater than 5, 4, 3, 2, 1, or even zero) percent by weight, on a theoretical oxides basis, $TiO_2$, based on the total weight of the granule for the respective granule.

7A. The plurality of granules of any preceding A Exemplary Embodiment, wherein the ceramic particles of each granule comprises no more than 10 (in some embodiments, no greater than 5, 4, 3, 2, 1, or even zero) percent by weight pure $Al_2O_3$, based on the total weight of the granule for the respective granule.

8A. The plurality of granules of any preceding A Exemplary Embodiment, wherein the granules have a Tumble Toughness Value, after immersion in water for two months at 20° C.±2° C., of at least 40 (in some embodiments, of at least 45, 50, 55, 60, 65, 70, 75, 80, 85, or even at least 90).

9A. The plurality of granules of any preceding A Exemplary Embodiment, wherein the binder is present as at least 5 (in some embodiments, at least 10, 15, 20, 25, 30, 35, 40, 45, or even up to 50; in some embodiments, in a range from 5 to 50, 10 to 50, or even 25 to 50) percent by weight of each granule, based on the total weight of the respective granule.

10A. The plurality of granules of any preceding A Exemplary Embodiment, wherein the granules have particle sizes in a range from 25 micrometers to 5 millimeters (in some embodiments, 50 micrometers to 1 millimeter, 100 micrometers to 500 micrometers, 200 micrometers to 500 micrometers; 500 micrometers to 2 millimeters; or even 2 millimeters to 5 millimeters).

11A. The plurality of granules of any preceding A Exemplary Embodiment, wherein the particulate silicate material has an average particles size in a range from 200 nanometers to 200 micrometers (in some embodiments, 200 nanometers to 100 micrometers, 250 nanometers to 50 micrometers, 500 nanometers to 2 micrometers, 2 micrometers to 5 micrometers, or even 5 micrometers to 20 micrometers).

12A. The plurality of granules of any preceding A Exemplary Embodiment, wherein the particulate silicate material has a bimodal distribution of sizes.

13A. The plurality of granules of any preceding A Exemplary Embodiment, wherein the binder is amorphous.

14A. The plurality of granules of any of Exemplary Embodiments 1A to 12A, wherein the binder is partially crystallized.

15A. The plurality of granules of any preceding A Exemplary Embodiment, wherein the alkali silicate is at least one of a cesium silicate, a lithium silicate, a potassium silicate, or a sodium silicate.

16A. The plurality of granules of any preceding A Exemplary Embodiment, wherein the hardener is amorphous.

17A. The plurality of granules of any preceding A Exemplary Embodiment, wherein the particulate silicate material comprises at least one of an aluminum hydroxide, a metal or metalloid oxide (e.g., silica (e.g., crystoballite, quartz, etc.), an aluminate (e.g., alumina, mullite, etc.), a titanate (e.g., titania), or zirconia), a soda-lime-silica glass, a borosilicate glass, porcelain, or marble.

18A. The plurality of granules of any preceding A Exemplary Embodiment, wherein the particulate silicate material comprises at least one of tectosilicate mineral (e.g., albite, orthoclase, microcline, etc.) or phyllosilicate mineral (e.g., kaolinite, halloysite, montmorillonite, etc.).

19A. The plurality of granules of any preceding A Exemplary Embodiment, wherein the particulate silicate material comprises mineral.

20A. The plurality of granules of any preceding A Exemplary Embodiment, wherein the granules further comprise at least one of a functional additive (e.g., rheology modifier (e.g., surfactant), durability modifier (e.g., nanosilica), and fluxing agent), an organic binder, or a pigment.

21A. The plurality of granules of any preceding A Exemplary Embodiment, wherein each respective granule has a density in a range from 0.5 $g/cm^3$ to 2.5 $g/cm^3$.

22A. The plurality of granules of any preceding A Exemplary Embodiment, wherein the granules have an as-cured outer surface.

23A. The plurality of granules of any preceding A Exemplary Embodiment, wherein the granules are in at least one of the following shapes: cubes, truncated cubes, pyramids, truncated pyramids, triangles, tetrahedra, spheres, hemispheres, or cones.

24A. The plurality of granules of any preceding A Exemplary Embodiment, wherein each granule has a first face and a second face separated by a thickness.

25A. The plurality of granules of Exemplary Embodiment 24A, wherein at least some granules further comprise at least one of a straight or sloping wall.

26A. The plurality of granules of any preceding A Exemplary Embodiment, wherein the granules have a Stain Value not greater than 15 (in some embodiments, not greater than 10, 5, 4, 3, 2, 1, or even not greater than 0.5).

27A. A roof comprising the plurality of granules of any preceding A Exemplary Embodiment.

1B. A method of making the plurality of granules of any preceding A Exemplary Embodiment, the method comprising:

curing an aqueous dispersion comprising particulate silicate material, alkali silicate precursor, and hardener to provide cured material; and crushing the cured material to provide the granules.

2B. The method of Exemplary Embodiment 1B, wherein the curing is conducted at least in part at a temperature in a range from 40° C. to 500° C. (in some embodiments, in a range from 50° C. to 450° C., 50° C. to 350° C., 50° C. to 250° C., 50° C. to 200° C., 50° C. to 150° C., 50° C. to 100° C., or even 50° C. to 80° C.). In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min.

3B. The method of any preceding B Exemplary Embodiment, wherein water is present in the aqueous dispersion up to 75 (in some embodiments, up to 70, 65, 60, 55, 50, 45, 40, 35, 30, 25, 20, or even up to 15; in some embodiments, in a range from 15 to 75, 15 to 50, or even 15 to 35) percent by weight, based on the total weight of the aqueous dispersion.

1C. A method of making the plurality of granules of any preceding A Exemplary Embodiment, the method comprising:

mixing material comprising particulate silicate material, alkali silicate precursor, and hardener to provide agglomerates comprising particulate silicate material, alkali silicate precursor, and hardener; and curing the agglomerates to provide the granules.

2C. The method of Exemplary Embodiment 1C, wherein the material is an aqueous dispersion.

3C. The method of any preceding C Exemplary Embodiment, wherein water is added to the material during mixing.

4C. The method of any preceding C Exemplary Embodiment, wherein the curing is conducted at least in part at a temperature in a range from 40° C. to 500° C. (in some embodiments, in a range from 50° C. to 450° C., 50° C. to 350° C., 50° C. to 250° C., 50° C. to 200° C., 50° C. to 150° C., 50° C. to 100° C., or even 50° C. to 80° C.). In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min.

5C. The method of any preceding C Exemplary Embodiment, wherein water is present in up to 75 (in some embodiments, up to 70, 65, 60, 55, 50, 45, 40, 35, 30, 25, 20, or even up to 15; in some embodiments, in a range from 15 to 75, 15 to 50, or even 15 to 35) percent by weight, based on the total weight of the aqueous dispersion.

1D. A method of making the plurality of granules of any preceding A Exemplary Embodiment, the method comprising:

spray drying an aqueous dispersion comprising particulate silicate material, alkali silicate precursor, and hardener to provide agglomerates comprising particulate silicate material, alkali silicate precursor, and hardener; and curing the agglomerates to provide the granules.

2D. The method of Exemplary Embodiment 1D, wherein the curing is conducted at least in part at a temperature in a range from 40° C. to 500° C. (in some embodiments, in a range from 50° C. to 450° C., 50° C. to 350° C., 50° C. to 250° C., 50° C. to 200° C., 50° C. to 150° C., 50° C. to 100° C., or even 50° C. to 80° C.). In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min.

3D. The method of any preceding D Exemplary Embodiment, wherein water is present in the aqueous dispersion up to 75 (in some embodiments, up to 70, 65, 60, 55, 50, 45, 40, 35, 30, 25, 20, or even up to 15; in some embodiments, in a range from 15 to 75, 15 to 50, or even 15 to 35) percent by weight, based on the total weight of the aqueous dispersion.

1E. A method of making the plurality of granules of any preceding A Exemplary Embodiment, the method comprising:

providing an aqueous dispersion in a tool comprising a plurality of cavities, the aqueous dispersion comprising particulate silicate material, alkali silicate precursor, hardener; and curing the aqueous dispersion in a tool to provide the granules.

2E. The method of Exemplary Embodiment 1E, wherein the curing is conducted at least in part at a temperature in a range from 40° C. to 500° C. (in some embodiments, in a range from 50° C. to 450° C., 50° C. to 350° C., 50° C. to 250° C., 50° C. to 200° C., 50° C. to 150° C., 50° C. to 100° C., or even 50° C. to 80° C.). In some embodiments, curing is conducted in two stages. For example, a first curing stage at least in part at a temperature in a range from 20° C. to 100° C., and a second, final curing stage at least in part at a temperature in a range from 200° C. to 500° C. In some embodiments, the heating rate for each stage is at one or more rates in a range from 5° C./min. to 50° C./min.

3E. The method of any preceding E Exemplary Embodiment, wherein water is present in the aqueous dispersion up to 75 (in some embodiments, up to 70, 65, 60, 55, 50, 45, 40, 35, 30, 25, 20, or even up to 15; in a range from 15 to 75, 15 to 50, or even 15 to 35) percent by weight, based on the total weight of the aqueous dispersion.

Advantages and embodiments of this invention are further illustrated by the following examples, but the particular materials and amounts thereof recited in these examples, as well as other conditions and details, should not be construed to unduly limit this invention. All parts and percentages are by weight unless otherwise indicated.

EXAMPLES

Materials

TABLE 1

| Material | Description | Source |
|---|---|---|
| LITHISIL 829 | Potassium lithium silicate solution in water, wt. ratio $SiO_2/K_2O + Li_2O = 2.5$ | PQ Corporation, Malvern, PA, under the trade designation "LITHISIL829" |
| BW50 | Sodium silicate solution in water, wt. ratio $SiO_2/Na_2O = 1.6$ | PQ Corporation, under the trade designation "BW50" |

TABLE 1-continued

| Material | Description | Source |
|---|---|---|
| Sodium Fluorosilicate | Na$_2$SiF$_6$, hardener | Alfa Aesar, Haverhill, MA |
| AEROSIL 200 | Hydrophilic fumed silica | Evonik Industries, Essen, Germany, under the trade designation "AEROSIL 200" |
| ACTI-MIN RP-2 | Kaolinite, Al$_2$Si$_2$O$_5$(OH)$_4$ | Active Minerals Int., LLC, Quincy, FL, under the trade designation "ACTI-MIN RP-2" |
| Mineral Powder | A powder having the following composition: quartz (25-30 wt. %); potassium feldspar (10-20 wt. %); plagioclase feldspar (35-45 wt. %); amphibole (3-5 wt. %); biotite (2-5 wt. %); and magnetite (1-4 wt. %) | |

Methods
General Method I For Making Granules

Granules were made generally as follows, with further specifics provided in the Examples below: First, mineral filler and hardener were homogenized by ball milling. Next, the homogenized dry part was combined with the liquid part and stirred at 1000 rpm for 15 minutes. Slurry was cast into triangular mold cavities of 0.42 mm depth and 1.693 mm on each side, with 98 degree draft angle. Casted granules were subjected to a two-stage curing.

General Method II For Making Granules

Granules were formed in a tumble agglomerator (Eirich mixer, obtained from Maschinenfabrik Gustav Eirich GmbH & Co., Hardheim, Germany). The liquid part, comprising liquid sodium silicate, and the homogenized dry part were combined in the agglomerator. The resulting green granules were cured as described in "General Method I of Making Granules." After curing, the granules were sieved, and the fraction between 600-1000 micrometers retained.

Method for Determining Granule Tumble Toughness

Granule Tumble Toughness Values (wt. %) were determined before and after 2 month immersion in water using the Abrasion Resistance Test Roofing Procedure from the Asphalt Roofing Manufacturers Association (ARMA) Granule Test Procedures Manual, ARMA Form No. 441-REG-96, the disclosure of which is incorporated herein by reference. More specifically, a 125 gram sample was placed on the sieve shaker (obtained under the trade designation "RX-29 RO-TAP" from W. S. Tyler Industrial Group, Mentor, Ohio) and agitated for 10 minutes to ensure complete removal of the material finer than the mesh corresponding to the original diameter of the smallest fraction of the granules distribution (100 Mesh). 100 grams of the granules were weighted and placed them inside the 5.1 cm (2 inch) diameter pipe tester. The pipe was rotated by turning it end for end 100 times, controlling rate of rotation so that the granules drop cleanly without sliding. At the end of the test, the top cap was unscrewed, the pipe was turned over, the contents emptied into the sieve, and the pan placed in the sieve shaker ("RO-TAP") and run for 5 minutes.

The Tumble Toughness Values, before and after immersion in water at 20° C.±2° C., are reported as the percent by weight of the material remaining on the sieve with mesh corresponding to the original diameter of the smallest fraction of the granules distribution (100 mesh).

Method for Stain Resistance Test

A four-day stain test was an accelerated measurement of the tendency of roofing granules to adsorb asphaltic oils in an asphalt-based substrate carried out in accordance with the procedure described in PCT Pub. No. WO2010/091326 A2, published Aug. 12, 2010, the disclosure of which is incorporated herein by reference. More specifically, the granules of each sample were partially embedded in asphalt that had been heated to 180° C. The partially embedded granules were placed on a tray in an oven at 80° C. for 96 hours (4 days). The trays were removed from the oven, and the asphalt allowed to cool to room temperature.

The granules on the asphalt substrate were then measured for staining under a colorimeter (obtained under the trade designation "LABSCAN" from HunterLab, Reston, Va.) and a staining value calculated. Stain was measured by the total change in color measured in CIELAB (L*a*b*) units, delta E, of the unexposed and the four-day heat exposed granules. Stain Value=$\Delta E^* = [(L^*4\text{-day}-L^*0\text{-day})^2+(a^*4\text{-day}-a^*0\text{-day})^2+(b^*4\text{-day}-b^*0\text{-day})2]^{1/2}$. A higher stain value represented a greater change in color, which was undesired.

Method for Determining Phase Composition and Crystallinity

Crystal structure and phase transformation were studied by x-ray diffraction (XRD) using an x-ray diffractometer (obtained under the trade designation "RIGAKU MINI FLEXII" from Rigaku Americas, The Woodlands, Tex.) with CuKα radiation (1.54 Å) over the 2θ range of 20 to 80. Phase composition of materials was determined by semi-quantitative X-ray diffraction analysis using the Relative Intensity Ratio (RIR) method.

Method for Determining Porosity

The Brunauer, Emmett and Teller (BET) surface area and total pore volume were determined by N$_2$ adsorption. More specifically, samples were characterized by N$_2$ adsorption at 77° K using a gas sorption analyzer (obtained under the trade designation "MICROMERITICS;" Model ASAP-2020 from Micromeritics Instruments, Norcross, Ga.). Each specimen was outgassed for 24 hours at 573° K to remove any moisture or adsorbed contaminants that may have been present on the surface. The mean pore diameter, $D_p$, was calculated from $D_p = 4V_t/S$, where $V_t$ is the total volume of pores, and S being the BET surface area.

Examples 1-3 (EX1-EX3) and Comparative Example A (CE-A)

EX1 and EX2 were prepared as described in "General Method I For Making Granules." EX3 was prepared as described in "General Method II For Making Granules II." The composition and processing parameters of each of EX1-EX3 are summarized in Table 2, below.

TABLE 2

| Component | EX 1 | EX 2 | EX 3 |
|---|---|---|---|
| LITHISIL 829 | 0 | 36 | 0 |
| BW50 | 37.9 | 0 | 26 |

TABLE 2-continued

| Component | EX 1 | EX 2 | EX 3 |
|---|---|---|---|
| $Na_2SiF_6$ | 10.6 | 6 | 3 |
| Mineral Powder | 51.2 | 57 | 70 |
| AEROSIL 200 | 0.1 | 0 | 0 |
| Kaolinite | 0.3 | 0 | 0 |

Temperature of curing stage 1: up to 60° C. @ a heating rate of 10° C./min.
Temperature of curing stage 2: up to 150° C. @ a heating rate of 10° C./min.

CE-A was a commercial roofing granule, obtained from 3M Company, St. Paul, Minn., under trade designation "COOL WHITE 9380."

The FIGURE is an optical image of EX2 material. EX1-EX3 samples were characterized using the Method For Determining Granule Tumble Toughness, the Method For Stain Resistance Test, the Powder X-Ray Diffraction Method and the Brunauer, Emmett, and Teller (BET) Method. The results are summarized in Tables 3 and 4, below.

TABLE 3

| Phase | PDF number | RIR | Phase concentration, wt. % |
|---|---|---|---|
| Quartz ($SiO_2$) | 00-046-1045 | 3.41 | 18-29 |
| Albite ($NaAlSi_3O_8$) | 00-041-1480 | 1.06 | 66-74 |
| Orthoclase ($KAlSi_3O_8$) | 01-071-1540 | 0.74 | 6-11 |
| Phlogopite-1M ($[K(Mg,Fe)_3(Al,Fe)Si_3O_{10}(OH,F)_2]$) | 00-042-1437 | 3.40 | 0.5-10 |
| Clinochlore-1MIIb ($(Mg,Al,Fe)_6(Si,Al)_4O_{10}(OH)_6$) | 00-029-0701 | 3.00 | 0.5-5 |

TABLE 4

| Property | Example | | | |
|---|---|---|---|---|
| | EX 1 | EX 2 | EX 3 | CE-A |
| Tumble toughness before immersion in water/after immersion in water, wt. % | 99.6/50.0 | 99.7/70.1 | 95.1/40.1 | 99.7/97.01 |
| Stain Value, ΔE* | 1.10 | 0.9 | 2.2 | 0.65 |
| Pycnometric density (g/) | 2.41 | 2.48 | 2.63 | 2.6-2.75 |
| Total pore volume $cm^3/g$ mean pore diameter $D_p$ (nm) by $N_2$ sorption | 0.1/500 | 0.05/200 | 0.04/100 | 0.03/12 |

X-ray diffraction (XRD) patterns (not shown) revealed no new crystalline phase in the final product, and only the phases corresponding to the components of mineral powder used as the filler were registered. Table 3 summarizes the phase composition of mineral powder, RIR values and (Powder Diffraction File) PDF numbers.

Foreseeable modifications and alterations of this disclosure will be apparent to those skilled in the art without departing from the scope and spirit of this invention. This invention should not be restricted to the embodiments that are set forth in this application for illustrative purposes.

What is claimed is:

1. A plurality of granules comprising particulate silicate material bonded together with an inorganic binder, the inorganic binder comprising reaction product of at least alkali silicate and hardener, wherein the hardener is at least one of aluminum phosphate, amorphous aluminosilicate, fluorosilicate, Portland cement, or a calcium silicate, wherein the particulate silicate material is present as at least 50 percent by weight of each granule, based on the total weight of the respective granule, wherein each granule has a total porosity in a range from greater than 20 to 50 percent by volume, based on the total volume of the respective granule, and wherein the granules have a Tumble Toughness Value of at least 70 before immersion in water and at least 40 after immersion in water at 20° C.±2° C. for two months.

2. The plurality of granules of claim 1, wherein each granule collectively comprises at least 80 percent by weight collectively of the particulate silicate material, the alkali silicate, and the hardener, based on the total weight of the respective granule.

3. The plurality of granules of claim 1, wherein the particulate silicate particles each have a longest dimension, wherein the granules each have a longest dimension, and wherein the longest dimension of each silicate particle for a given granule is no greater than 20% of the diameter of said given granule.

4. The plurality of granules of claim 1, wherein the granules comprise ceramic particles, wherein the ceramic particles of each granule comprise no more than 10 percent by weight pure $TiO_2$, based on the total weight of the granule for the respective granule.

5. The plurality of granules of claim 1, wherein the granules comprise ceramic particles, wherein the ceramic particles of each granule comprise no more than 10 percent by weight, on a theoretical oxides basis, $TiO_2$, based on the total weight of the granule for the respective granule.

6. The plurality of granules of claim 1, wherein the granules comprise ceramic particles, wherein the ceramic particles of each granule comprise no more than 10 percent by weight pure $Al_2O_3$, based on the total weight of the granule for the respective granule.

7. The plurality of granules of claim 1, wherein the binder is present as at least 5 percent by weight of each granule, based on the total weight of the respective granule.

8. The plurality of granules of claim 1, wherein the granules have particle sizes in a range from 25 micrometers to 5 millimeters.

9. The plurality of granules of claim 1, wherein the particulate silicate material has particles sizes in a range from 200 nanometers to 200 micrometers.

10. The plurality of granules of claim 1, wherein the binder is amorphous.

11. The plurality of granules of claim 1, wherein the binder is partially crystallized.

12. The plurality of granules of claim 1, wherein the alkali silicate is at least one of a cesium silicate, a lithium silicate, a potassium silicate, or a sodium silicate.

13. The plurality of granules of claim 1, wherein the hardener is amorphous.

14. The plurality of granules of claim 1, wherein the particulate silicate material comprises at least one of tectosilicate mineral or phyllosilicate mineral.

15. The plurality of granules of claim 1, wherein the particulate silicate material comprises mineral.

16. The plurality of granules of claim 1, wherein the granules further comprise at least one of a functional additive, an organic binder, or a pigment.

17. The plurality of granules of claim 1, wherein the granules have a Stain Value not greater than 15.

18. A method of making the plurality of granules of claim 1, the method comprising:
   curing an aqueous dispersion comprising particulate silicate material, alkali silicate precursor, and hardener to provide cured material; and
   crushing the cured material to provide the granules.

19. A method of making the plurality of granules of claim 1, the method comprising:
   mixing material comprising particulate silicate material, alkali silicate precursor, and hardener to provide agglomerates comprising particulate silicate material, alkali silicate precursor, and hardener; and
   curing the agglomerates to provide the granules.

20. A method of making the plurality of granules of claim 1, the method comprising:
   spray drying an aqueous dispersion comprising particulate silicate material, alkali silicate precursor, and hardener to provide agglomerates comprising particulate silicate material, alkali silicate precursor, and hardener; and
   curing the agglomerates to provide the granules.

21. A method of making the plurality of granules of claim 1, the method comprising:
   providing an aqueous dispersion in a tool comprising a plurality of cavities, the aqueous dispersion comprising particulate silicate material, hardener, and alkali silicate precursor; and
   curing the aqueous dispersion in a tool to provide the granules.

* * * * *